UNITED STATES PATENT OFFICE.

THOMAS J. MAYALL, OF ROXBURY, MASSACHUSETTS.

IMPROVEMENT IN COMPOSITION OF EMERY FOR GRINDING AND POLISHING TOOLS.

Specification forming part of Letters Patent No. 25,841, dated October 18, 1859.

*To all whom it may concern:*

Be it known that I, THOMAS J. MAYALL, of Roxbury, in the county of Norfolk and State of Massachusetts, have invented certain new and useful Improvements in Compounds for Making Emery Sharpening and Polishing Wheels and Tools of Various Kinds; and I do hereby declare that the following description forms a full and exact specification of the same, wherein I have set forth the nature and principles of my improvements by which my invention may be distinguised from all others of a similar class, together with such parts as I claim and desire to have secured to me by Letters Patent.

The present process of manufacturing emery polishing-tools, as carried on under the Letters Patent granted to me, bearing date the 11th day of January, 1859, and the 17th day of May, 1859, consists in combining emery with india-rubber, sulphur, and olive-oil. By those processes I can only use a limited amount of emery, and the tools become clogged in using, while the action of the emery is impeded by the presence of the rubber; and in order to obviate these difficulties I have invented a new and improved process, which enables me to compound with india-rubber or gutta-percha nearly double the proportion of emery which I formerly used, and gives great strength to the tool when finished.

My present improvement consists in a new compound, in which I use a very large quantity of emery and a very small proportion of rubber or gutta-percha and sulphur or other substances—viz., about fifteen pounds of emery to one pound of rubber or gutta-percha and five ounces of sulphur. These ingredients are perfectly combined and mixed together, and the composition thus formed is then placed in metallic molds and subjected to great pressure therein, and then heated from fifteen minutes to four hours at a temperature of 260° to 300° Fahrenheit.

When it is desirable, I can add olive-oil to the composition in the proportion of one-half pound of olive-oil to the quantities of rubber, sulphur, and emery above named; or I can employ other ingredients also to mix with the emery, thus: I take linseed-oil boiled to the consistency of thick pitch and combine it with emery and sulphur in the proportion of two pounds of oil, fifteen pounds of emery, and five ounces of sulphur. This composition is pressed into the molds very strongly and then submitted to the action of artifical heat, from 260° to 300° Fahrenheit, for about one hour.

I have combined various other substances with emery for the above purposes. The best composition, however, is india-rubber or gutta-percha and sulphur, as above described, as that composition enables me to use the largest proportion of emery; but, whatever ingredients are to be used, a great pressure and a high degree of artificial heat are indispensable.

Having thus described my invention and indicated a mode in which the same is or may be carried into effect, I wish it here to be understood that I do not confine myself to the particular mode herein described and set forth, as there are or may be other modes or means whereby the same results may be obtained, and therefore I do not claim in this application the mode or process of compounding ingredients; but

What I claim as new, and desire to have secured to me by Letters Patent, is—

My new compound for emery sharpening and polishing tools, the same being made by combining fifteen pounds of emery, one pound of india-rubber or gutta-percha, and five ounces of sulphur.

THOS. J. MAYALL.

Witnesses:
JOSEPH GAVELT,
ALBERT W. BROWN.